US008176325B2

(12) United States Patent
Lai et al.

(10) Patent No.: US 8,176,325 B2
(45) Date of Patent: May 8, 2012

(54) PEER-TO-PEER ACCESS CONTROL METHOD BASED ON PORTS

(75) Inventors: Xiaolong Lai, Xl'an (CN); Jun Cao, Xi'an (CN); Bianling Zhang, Xl'an (CN); Zhenhai Huang, Xi'an (CN); Hong Guo, Xi'an (CN)

(73) Assignee: China Iwncomm Co., Ltd. (CN)

( * ) Notice: Subject to any disclaimer, the term of this patent is extended or adjusted under 35 U.S.C. 154(b) by 737 days.

(21) Appl. No.: 11/816,715

(22) PCT Filed: Feb. 21, 2006

(86) PCT No.: PCT/CN2006/000248
§ 371 (c)(1),
(2), (4) Date: Apr. 4, 2008

(87) PCT Pub. No.: WO2006/086931
PCT Pub. Date: Aug. 24, 2006

(65) Prior Publication Data
US 2008/0288777 A1    Nov. 20, 2008

(30) Foreign Application Priority Data

Feb. 21, 2005 (CN) .......................... 2005 1 0041713

(51) Int. Cl.
*H04L 29/06* (2006.01)
(52) U.S. Cl. ........ 713/171; 713/168; 713/169; 713/170; 726/2; 726/3; 726/4; 726/5; 709/238; 709/239
(58) Field of Classification Search ........... 713/168–171
See application file for complete search history.

(56) References Cited

U.S. PATENT DOCUMENTS 7,181,530 B1 *  2/2007  Halasz et al. ................. 709/238
(Continued)

FOREIGN PATENT DOCUMENTS

| CN | 1466273 | 7/2004 |
|---|---|---|
| CN | 1416241 | 5/2007 |
| JP | 2002-344438 | 11/2002 |
| WO | WO03/079191 A1 | 9/2003 |

OTHER PUBLICATIONS

JC Chen, Wireless LAN security and IEEE 802.11i-2005, Wireless Communication, IEEE, pp. 1-10.*

(Continued)

*Primary Examiner* — Taghi Arani
*Assistant Examiner* — Amir Mehrmanesh
(74) *Attorney, Agent, or Firm* — Carlson, Gaskey & Olds, P.C.

(57) ABSTRACT

A port based peer access control method, comprises the steps of: 1) enabling the authentication control entity; 2) two authentication control entities authenticating each other; 3) setting the status of the controlled port. The method may further comprise the steps of enabling the authentication server entity, two authentication subsystems negotiating the key. By modifying the asymmetry of background technique, the invention has advantages of peer control, distinguishable authentication control entity, good scalability, good security, simple key negotiation process, relatively complete system, high flexibility, thus the invention can satisfy the requirements of central management as well as resolve the technical issues of the prior network access control method, including complex process, poor security, poor scalability, so it provides essential guarantee for secure network access.

3 Claims, 2 Drawing Sheets

U.S. PATENT DOCUMENTS

| | | | |
|---|---|---|---|
| 7,447,166 B1 * | 11/2008 | Kaluve et al. | 370/254 |
| 7,496,344 B2 * | 2/2009 | Stadelmann et al. | 455/406 |
| 7,502,926 B2 * | 3/2009 | Luo et al. | 713/163 |
| 7,624,267 B2 * | 11/2009 | Huang et al. | 713/168 |
| 2002/0043477 A1 | 4/2002 | Winter | |
| 2004/0003247 A1 * | 1/2004 | Fraser et al. | 713/169 |
| 2008/0043686 A1 * | 2/2008 | Sperti et al. | 370/338 |

OTHER PUBLICATIONS

PCT/CN2006/000248 Search Report.

201.1X IEEE Standard for Local and Metropolitan Area Networks Port—Based Network Access Control, IEEE, Dec. 13, 2004, pp. 12-22,30,33-38-41,49, 144.

* cited by examiner

PEER-TO-PEER ACCESS CONTROL METHOD BASED ON PORTS

FIELD OF THE INVENTION

The present invention relates to a network technique, in particular to a port based peer access control method.

BACKGROUND

Network access control generally involves three systems: user, access point and background server that centrally controls both the user and the access point. IEEE 802.1x is called port based network access control protocol. In prior cable networks, in addition to traditional web browser access control method and point to point protocol over Ethernet, emerging access methods are based on IEEE 802.1x technique. IEEE 802.1x technique has such advantages as the separation of control and service, high flexibility, strong adaptability, and has found wide use in various networks. IEEE802.1x technique has been adopted by various wireless networks, such as wireless LAN (IEEE 802.11, wireless MAN (IEEE802.16e), etc.

Authentication is the key of network access control, the purpose of which is to establish trust, which is the base of providing network service, between the user and the access point. A security mechanism is required to enable the mutual authentication between the network and the user no matter whether cable network access or wireless network access is used.

IEEE802.1x is a method implementing authentication at the link layer, and is a port based technique. A system port provides a method by which the system is enabled to access the services of other systems and provide services to other systems.

IEEE 802.1x defines three kinds of entities:

Authenticator—the port control entity of a system authenticates and authorizes the supplicant before the services provided by the system are allowed to be accessed. The system is called an authenticator system, the port control entity of it is called an authenticator.

Supplicant—a system requesting to access the services provided by an authenticator system is called a supplicant system, the port control entity of which is called a supplicant.

Authentication Server—an authentication server is such an entity that represents the authenticator to identify the qualification of the supplicant, determines whether the supplicant system can be authorized to access the services provided by the authenticator.

An authenticator system has two access points to the transport media. One access point is called controlled port, which has two status: authenticated and unauthenticated, and allows packets to pass by only when it is in the authenticated status; the other access point is called uncontrolled port, which allows packets to pass by regardless of its status.

The relationship among the functional entities of IEEE802.1x is shown in FIG. 1.

IEEE 802.1x provides only one framework for authentication, which is used in combination with the extensible authentication protocol to provide authentication and key negotiation in practice. IEEE802.1x has an asymmetric structure, the functionality differs greatly at the supplicant and the authenticator. There is no authentication function on the authenticator. There is no authentication function on the authenticator. Therefore, the authentication is performed between the supplicant and the authentication server. Although the authentication server and the authenticator can be implemented in a single system, the advantage of IEEE802.1x, i.e. the central control by the authenticator, would be reduced greatly. It is commonly employed presently that the authentication server and the authenticator are implemented in separate systems. While authenticating, the authentication server directly passes the authentication result to the authenticator. If key negotiation is further required, it should be performed between the authentication server and the supplicant, and then the negotiated key is sent by the authentication server to the supplicant, the supplicant and the authenticator perform authentication and key negotiation based on dynamic shared key. Therefore, the disadvantages of IEEE802.1x are as following:

1. The structure of IEEE 802.1x is asymmetric, the functionality differs greatly at the supplicant and the authenticator. The authenticator does not have authentication function, which is performed between the supplicant and the authentication server. Although the authentication server and the authenticator can be implemented in a single system, the advantage of IEEE802.1x, i.e. the central control by the authenticator, would be reduced greatly.

2. poor extensibility. A predefined security channel exists between each authenticator and the authentication server. The required system resources of the authentication server increases and the management becomes more complex with increasing number of security channels, so it is not suitable to configure a lot of security channels, the network scalability is limited.

3. complicated key negotiation process. The key is used for data protection between the supplicant and the authenticator, but the negotiation is need to be firstly performed between the supplicant and the authentication server before it can be performed between the supplicant and the authenticator.

4. New attack points are introduced so that the security is decreased. The primary key negotiated by the supplicant and the authentication server is passed by the authentication server to the authenticator. New security attack points are introduced by passing the key over the network.

5. The authenticator does not have independent identity. For the supplicant, the identity of the authenticators managed by the same authentication server is not distinguishable. Additional functional entities have to be added in application environments when it is necessary to distinguish the authenticators, which introduces additional complexity.

Contents of the Invention

The object of the invention is to overcome the defects existed in prior technique, provide a peer access control method by changing the asymmetric structure of background technique. The method of the invention can satisfy the requirements of central management, as well as solve the technical problems of prior network access control method, including complicated process, poor security, poor scalability, so it provides essential guarantee for secure network access.

The technical solution of the invention is a port based peer access control method, which comprises:

A) initiating authentication control entities respectively located in a user and an access point for communication with each other, each authentication control entity has an unique and independent identity for a peer authentication and comprises an authentication subsystem, a controlled port and an uncontrolled port connecting the respective authentication subsystems with a transmission medium, each of said authentication subsystems having authentication and port control functions, and each of said authentication subsystems is connected to the respective uncontrolled port and controls a status of its controlled port with respect to being authenticated or unauthenticated.

B) The authentication control entities authenticate each other by communication through the respective uncontrolled ports between their authentication subsystems, and the authentication subsystems complete the authentication process with the participation of an authentication server entity, and wherein the authentication server entity communicates security management information necessary for authentication with the authentication subsystem of the corresponding authentication control entity, and the authentication sever entity does not complete the authentication standing for the corresponding authentication control entity.

C) The respective authentication subsystems set the status of the respective controlled ports as authenticated if the authentication is successful, wherein the controlled port changes from opened to closed, allowing packets to pass through and, otherwise, the respective authentication subsystems set the status of the respective controlled ports as unauthenticated, wherein the controlled port remains opened.

The above method may further comprise:

Enabling the authentication server entity: the user and the access point firstly enables the authentication control entity and the authentication server entity, while they are to communicate; said authentication server entity stores the security management information related to the authentication control entity; said authentication server entity is connected to the authentication subsystem of said authentication control entity, the authentication server entity communicates the security management information with the authentication subsystem of the authentication control entity, to provide the information necessary for authentication; said authentication subsystem completes the authentication process with or without the assist of the authentication server entity, or complete the key negotiation all by itself.

The above authentication server entity stores the attribute information of the authentication control entity, and transmits such attribute information to the authentication control entity.

The above method may further comprise:

Two authentication subsystem negotiating the key: said authentication subsystem comprises the key negotiation function, the key negotiation can be performed during or after the authentication process while said two authentication control entities authenticating each other; if the key negotiation is to be done independently after the authentication completes, it would be done by the two authentication control entities themselves.

If the above key negotiation is completed simultaneously with the authentication during the authentication process, the authentication subsystem can complete the key negotiation process with the assist of the authentication server entity, or complete the key negotiation all by itself.

The above authentication server entity stores the attribute information of the authentication control entity, and transmits such attribute information to the authentication control entity.

The above method may further comprise:

Setting the status of the controlled port: after the authentication and the key negotiation process complete successfully, the authentication subsystem sets the status of the controlled port as authenticated, the status of the controlled port changes from opened to closed, allowing packets to pass through; if the authentication and the key negotiation process are not successful, the authentication subsystem sets the status of the controlled port as unauthenticated, the controlled port still remains opened.

The above authentication control entity and authentication server entity can be implemented in a single system or in separate systems; said single system may comprise one or more authentication control entities.

The advantages of the invention are as following:

1. Peer control. The present method have both the two systems (generally one is the user and the other is access point) comprise an authentication control entity, so that the two systems can authenticate directly, i.e. peer, to provide more powerful support for the authentication function.

2. Authentication control entities are distinguishable. The authentication control entity has independent identity, and is not simply under the control of the authentication server. The independent identity of the authentication control entity enables not to depend on the authentication server entity essentially, and thus the authentication control entity itself can be distinguished.

3. Good extensibility. There is not any predefined security channel existing between the authentication control entity and the authentication server entity, and thus the central control by the authentication server entity for the authentication control entities is facilitated and good extensibility can be achieved.

4. Good security. The authentication control entity can directly negotiate the key with other authentication control entities, and thus recovers the directness of the key negotiation, simplifies the network implementation, and enhances the security.

5. Simple key negotiation process. The authentication control entity can directly negotiate the key with other authentication control entities, thus reducing the complexity and improving the efficiency of the key negotiation.

6. Relatively complete system. The authentication server entity is the security manager of the authentication control entity, and includes the key management function of the authentication technique. The entities of the invention together compose a complete secure system, and complete the functions of authentication and key negotiation independently.

7. High flexibility. The authentication server entities can provide a lot of additional functions to achieve high flexibility.

8. Flexible implementation. It is not required to implement the functional entities defined by the invention in different network systems, one network system can implement one or more functional entities. As shown in FIG. 3, the authentication control entity and the authentication server entity can be implemented in the same network system. Meanwhile it is not required for one authentication server entity to correspond to one authentication control entity, while one authentication server entity can correspond to and manage a number of authentication control entities. As shown in FIG. 4, the authentication control entity 1 communicates with the authentication server entity through the uncontrolled port of the authentication control entity 2.

DESCRIPTION THE DRAWINGS

EMBODIMENTS

The invention comprises the following two entities:

1) Authentication control entity:

The authentication control entity comprises two ports connected to the transport media. One port is called controlled port, which has two status: the authenticated status and the unauthenticated status. It allows packets to pass through only if it is in the authenticated status. The other port is called uncontrolled port, which always allows packets to pass through regardless of its status. The controlled port and the uncontrolled port of the authentication control entity receive the packets from the underlying transport media simultaneously.

The authentication control entity comprises an authentication subsystem, which implements the security functions, including security functions such as authentication, key negotiation, as well as port control functions. The authentication subsystem is connected to the uncontrolled port, the status changing of the controlled port is controlled by the authentication subsystem.

The authentication control entity has an unique identity for authentication, and thus can implement the authentication function independently.

2) Authentication server entity:

The authentication server entity stores the security management information related to the authentication control entity, and connects to the authentication subsystem of the authentication control entity. While the authentication control entity and other authentication control entities are authenticating, the authentication server entity communicates the security management information with the authentication subsystem of the authentication control entity to provide the information necessary for authentication, but the authentication server entity does not complete the authentication standing for the authentication control entity. The authentication server entity also stores the attribute information of the authentication control entity, and transmits the attribute information to the authentication control entity according to the requirements of application.

Figure 1:
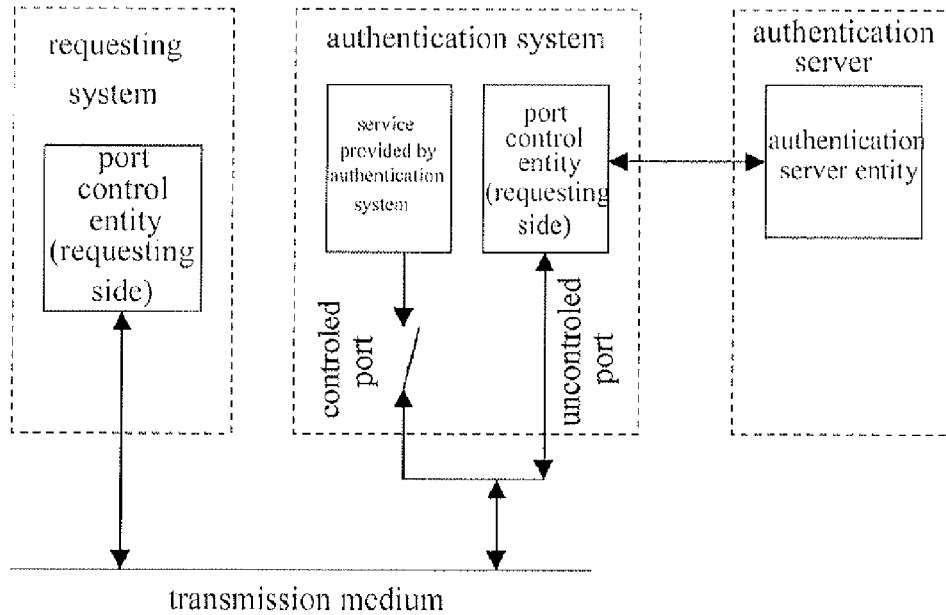
FIG. 1 is the diagram for the connection relationship among the functional entities of IEEE 802.1x.
Figure 2:
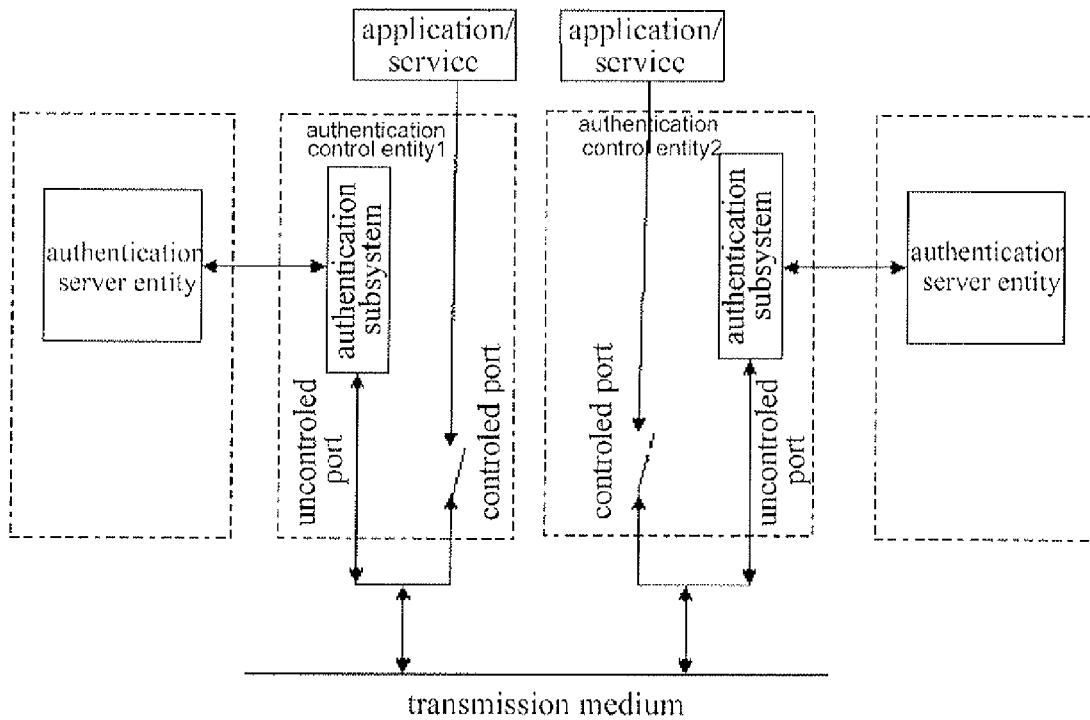
FIG. 2 is the diagram for the connection relationship among the functional entities of the invention.
Figure 3:
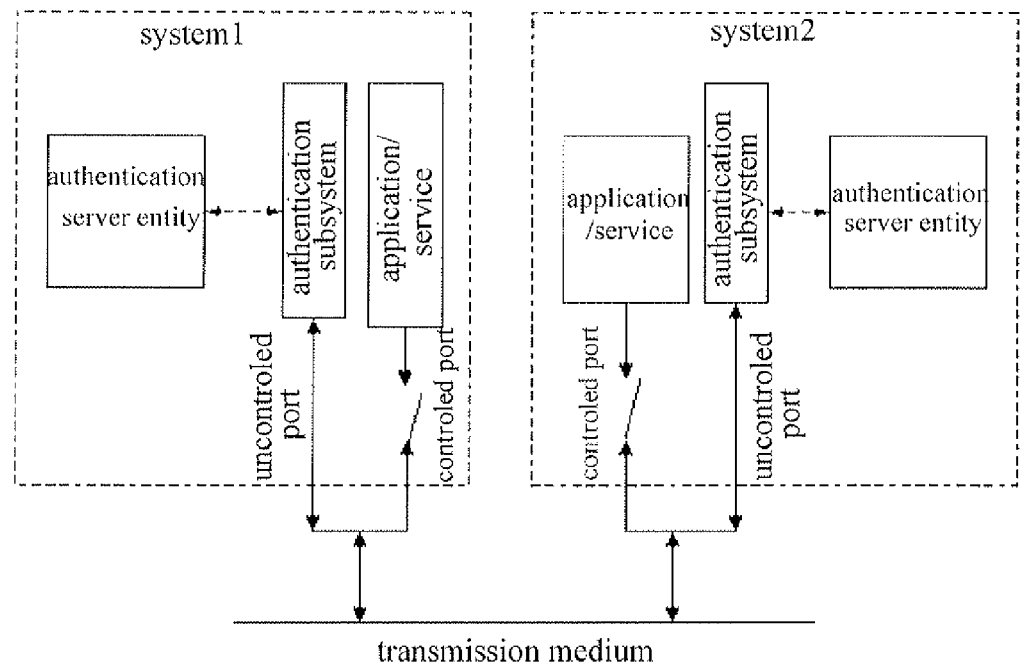
FIG. 3 is the schematic diagram of one embodiment in which the authentication server entity and the authentication control entity are implemented in a single system.
Figure 4:
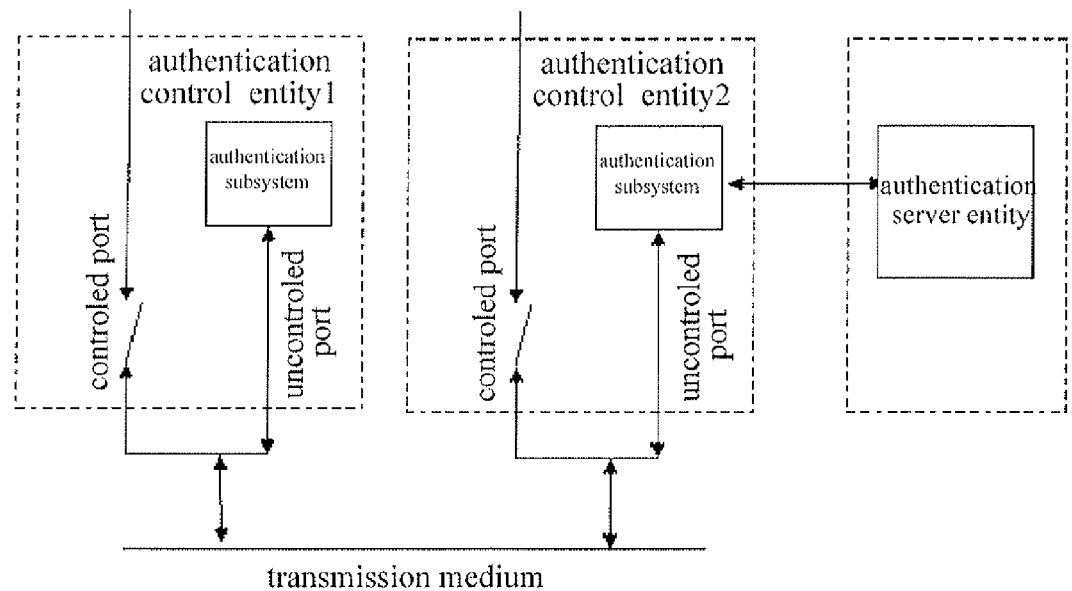
FIG. 4 is the schematic diagram of one embodiment in which on authentication server entity corresponds to a number of authentication control entities.

The relationship between the authentication control entity and the authentication server entity is illustrated as in FIG. 2.

A process of the peer access control method of the invention:

1) initiating the authentication control entity: the user and the access point must firstly initiate the authentication control entity when they are to communicate.

2) Two authentication control entities authenticating each other: two authentication control entities communicate through the uncontrolled port, their authentication subsystems authenticate each other. The authentication subsystem can complete the authentication process by itself, without the assist of the authentication server entity.

3) Two authentication control entities negotiating the key: if two authentication control entities need to negotiate the key, the key negotiation can be completed simultaneously with the authentication in the authentication process, or can be performed independently after the authentication process completes. If the key negotiation is to be performed independently after the authentication is completed, the key negotiation would be completed independently by the two authentication control entities, without the need of involving the authentication server entity.

4) Setting the status of the controlled port: if the authentication and the key negotiation are successful, the authentication subsystem sets the status of the controlled port as authenticated, the status of the controlled port transfers from opened to closed, allowing the packets to pass through; otherwise, the authentication subsystem sets the status of the controlled port as unauthenticated, the controlled port still remains opened.

Another process of the peer access control method of the invention:

1) Initiating the authentication control entity and the authentication server entity: both the user and the access point must firstly initiate the authentication control entity and the authentication server entity before they are to communicate.

2) Two authentication control entities authenticating each other: two authentication control entities communicate through the uncontrolled port, their authentication subsystems authenticate each other. The authentication subsystem can complete the authentication process with the assist of the authentication server entity, or complete the authentication process all by itself.

3) Two authentication control entities negotiate the key: if two authentication control entities need to negotiate the key, the key negotiation can be completed simultaneously with the authentication in the authentication process, or can be performed independently after the authentication process. If the key negotiation is to be performed independently after the authentication is completed, the key negotiation would be completed independently by the two authentication control entities, without the need of involving the authentication server entity.

4) Setting the status of the controlled port: if the authentication and the key negotiation are successful, the authentication subsystem sets the status of the controlled port as authenticated, the status of the controlled port transfers from opened to closed, allowing the packets to pass by; or otherwise, the authentication subsystem sets the status of the controlled port as unauthenticated, the controlled port still remains opened.

The relationship between the authentication control entity and the authentication server entity is shown as in FIG. 2.

The principle of the invention is:

By having both the user and the access point comprise an authentication control entity, the user and the access point can authenticate directly, i.e. peer access control, providing more powerful support for the authentication function. The authentication control entity has independent identity, and is not simply under the control of the authentication server entity. The independent identity of the authentication control entity enables it not to depend on the authentication server entity essentially, and thus the authentication control entity itself is distinguishable. The authentication control entity can directly negotiate the key with other authentication control entities, and thus recovers the directness of the key negotiation. The authentication server entity is the security manager of the authentication control entity, and includes the key management function of the authentication technique. The entities of the invention together compose a complete secure system, and complete the functions of authentication and key negotiation independently.

In practice, both the user and the access point achieve authentication through authentication control entity in network access control.

Technical glossary involved in the invention is as following:

IEEE 802.1x Port Based Network Access Control Protocol
PPPoE—Point to Point Protocol over Ethernet
IEEE 802.11—Wireless LAN
IEEE 802.16e —Wireless MAN Authenticator
Supplicant
Authentication Server
EAP—Extensible Authentication Protocol

The invention claimed is:

1. A port based peer access control method, comprising:

a) initiating authentication control entities respectively located in a user and an access point for communication with each other, each authentication control entity has a unique and independent identity for a peer authentication and comprises an authentication subsystem, a controlled port and an uncontrolled port connecting the respective authentication subsystems with a transmission medium, each of said authentication subsystems having authentication and port control functions, and each of said authentication subsystems is connected to the respective uncontrolled port and controls a status of its controlled port with respect to being authenticated or unauthenticated;

b) the authentication control entities authenticating each other by communication through the respective uncontrolled ports between their authentication subsystems, wherein the authentication subsystems complete the authentication process with the participation of an authentication server entity, and wherein the authentication server entity communicates security management information necessary for authentication with the authentication subsystem of the corresponding authentication control entity, and the authentication sever entity does not complete the authentication standing for the corresponding authentication control entity; and c) the respective authentication subsystems set the status of the respective controlled ports as authenticated if the authentication is successful, wherein the controlled port changes from opened to closed, allowing packets to pass through and, otherwise, the respective authentication subsystems set the status of the respective controlled ports as unauthenticated, wherein the controlled port remains opened;

the authentication control entities negotiating a key, wherein the authentication subsystems comprise a function of key negotiation, and when the authentication control entities are authenticating each other, the key negotiation can be completed during or after an authentication process and if the key negotiation is to be performed independently after the authentication is completed, the key negotiation is completed independently by the two authentication control entities, while the key negotiation is completed simultaneously with the authentication in the authentication process, the authentication subsystem can complete the key negotiation process with or without the assist of the authentication server entity, or complete the authentication process by itself.

2. The port based peer access control method according to claim 1, characterized in that, said authentication server entity stores the security management information of the authentication control entity, and transfers said security management information to the authentication control entity.

3. The port based peer access control method according to claim 1, characterized in that: each of said authentication control entities and said authentication server entities can be implemented in a single system or in separate systems and said single system can comprise one or more authentication control entities.

* * * * *

UNITED STATES PATENT AND TRADEMARK OFFICE
CERTIFICATE OF CORRECTION

| | | |
|---|---|---|
| PATENT NO. | : 8,176,325 B2 | Page 1 of 1 |
| APPLICATION NO. | : 11/816715 | |
| DATED | : May 8, 2012 | |
| INVENTOR(S) | : Lai et al. | |

It is certified that error appears in the above-identified patent and that said Letters Patent is hereby corrected as shown below:

ON THE TITLE PAGE item 75:

Inventor Xiaolong Lai's information should read as follows:

--Xiaolong Lai, Xi'an (CN)--

Inventor Bianling Zhang's information should read as follows:

--Bianling Zhang, Xi'an (CN)--

Signed and Sealed this
Eleventh Day of September, 2012

David J. Kappos
*Director of the United States Patent and Trademark Office*